(12) United States Patent
Hartman

(10) Patent No.: US 7,147,004 B1
(45) Date of Patent: Dec. 12, 2006

(54) CHECK VALVE FOR CAM LOCK FITTING

(76) Inventor: Jeffrey Hartman, 5121 Halls Mill Rd., #16, Mobile, AL (US) 36693

( * ) Notice: Subject to any disclaimer, the term of this patent is extended or adjusted under 35 U.S.C. 154(b) by 0 days.

(21) Appl. No.: 11/226,887

(22) Filed: Sep. 15, 2005

(51) Int. Cl.
*F16L 29/00* (2006.01)

(52) U.S. Cl. .............................. 137/614.06; 251/149.6

(58) Field of Classification Search ........... 137/614.06; 251/149.9
See application file for complete search history.

(56) References Cited

U.S. PATENT DOCUMENTS

| | | | |
|---|---|---|---|
| 3,664,634 A * | 5/1972 | Guertin et al. ......... | 137/614.06 |
| 3,860,274 A | 1/1975 | Ledstrom et al. | |
| 4,030,524 A * | 6/1977 | McMath et al. ....... | 137/614.06 |
| 4,269,215 A | 5/1981 | Odar | |
| 4,538,632 A | 9/1985 | Vogl | |
| 5,234,017 A | 8/1993 | Aflin et al. | |
| 5,273,071 A * | 12/1993 | Oberrecht .............. | 137/614.06 |
| 5,595,217 A | 1/1997 | Gillen et al. | |
| 5,863,079 A | 1/1999 | Donais et al. | |
| 6,095,190 A | 8/2000 | Wilcox et al. | |
| 6,290,267 B1 * | 9/2001 | Swingley ............... | 137/614.06 |

* cited by examiner

Primary Examiner—Kevin Lee
(74) Attorney, Agent, or Firm—George L. Williamson

(57) ABSTRACT

An apparatus discloses a cam lock fitting having a check valve which can be opened or closed inside the male or female end of the cam lock fitting so that when the check valve is closed the flow from either end of the cam lock fitting can be stopped by the check valve. The check valve may be located on the male end or the female end of the cam lock fitting. If the check valve is located on the female end it is operated by an arm connected to the lever of the cam lock fitting so that when the lever is opened the check valve is closed and vice versus. Furthermore, regarding the male end of the cam lock fitting, the check valve is normally maintained in the closed position and then when the male end is inserted into the female end, the check valve is opened by a rod member making contact with the facing of the female end of the cam lock fitting so that the check valve in the male cam lock fitting is then opened. Also provided is a pressure relief valve which may be located in the wall of the cam lock fitting or in the body of the check valve which releases any vacuum built up in the hose to prevent inadvertent, pressurized discharges of liquid from a hose having a vacuum therein so as to prevent any discharges when the cam lock fitting is disconnected.

10 Claims, 2 Drawing Sheets

CHECK VALVE FOR CAM LOCK FITTING

BACKGROUND OF THE INVENTION

1. Field of the Invention

The present invention relates generally to cam lock fittings and, more particularly, is concerned with a cam lock fitting having a check valve thereon.

2. Description of the Prior Art

Cam lock fittings have been described in the prior art. However, none of the prior art devices disclose the unique features of the present invention.

U.S. Pat. No. 6,095,190 to Wilcox, et al., dated Aug. 1, 2000, disclosed a coupling with a female half having internal pressure relief.

U.S. Pat. No. 5,863,079 to Donais, et al., dated Jan. 26, 1999, disclosed a quick-connect, disconnect coupling.

U.S. Pat. No. 5,595,217 to Gillen, et al., dated Jan. 21, 1997, disclosed a dry break coupling assembly with a cam locking connection system.

U.S. Pat. No. 5,234,017 to Aflin et al., dated Aug. 10, 1993, disclosed a restrictor valve for metered liquid dispensing system.

U.S. Pat. No. 4,538,632 to Vogl dated Sep. 3, 1985, disclosed a shut-off valve for a fuel truck or tanker drain off having down spouts.

U.S. Pat. No. 4,269,215 to Odar dated May 26, 1981, disclosed a vapor flow control valve.

U.S. Pat. No. 3,860,274 to Ledstrom, et al., dated Jan. 14, 1975 disclosed a pipe coupling.

While these devices related to cam lock fittings may be suitable for the purposes for which they were designed, they would not be as suitable for the purposes of the present invention, as hereinafter described.

SUMMARY OF THE PRESENT INVENTION

The present invention discloses a cam lock fitting having a check valve which can be opened or closed inside the male or female end of the cam lock fitting so that when the check valve is closed the flow from either end of the cam lock fitting can be stopped by the check valve. The check valve may be located on the male end or the female end of the cam lock fitting. If the check valve is located on the female end it is operated by an arm connected to the lever of the cam lock fitting so that when the lever is opened the check valve is closed and vice versus. Furthermore, regarding the male end of the cam lock fitting, the check valve is normally maintained in the closed position and then when the male end is inserted into the female end, the check valve is opened by a rod member making contact with the facing of the female end of the cam lock fitting so that the check valve in the male cam lock fitting is then opened. Also provided is a pressure relief valve which may be located in the wall of the cam lock fitting or in the body of the check valve which releases any vacuum built up in the hose to prevent inadvertent, pressurized discharges of liquid from a hose having a vacuum therein so as to prevent any discharges when the cam lock fitting is disconnected.

An object of the present invention is to provide a check valve on a cam lock fitting so as to stop back flow of liquid from the disconnected cam lock fitting. A further object of the present invention is to provide a check valve on either the male or female end of a cam lock fitting. A further object of the present invention is to provide a check valve which can be easily operated as a part of the normal operation of a cam lock fitting. A further object of the present invention is to provide a check valve which is automatically closed when the cam lock fitting is opened. A further object of the present invention is to provide a pressure relief valve on a cam lock fitting which will present inadvertent pressurized discharges from a hose connected to the cam lock fitting.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
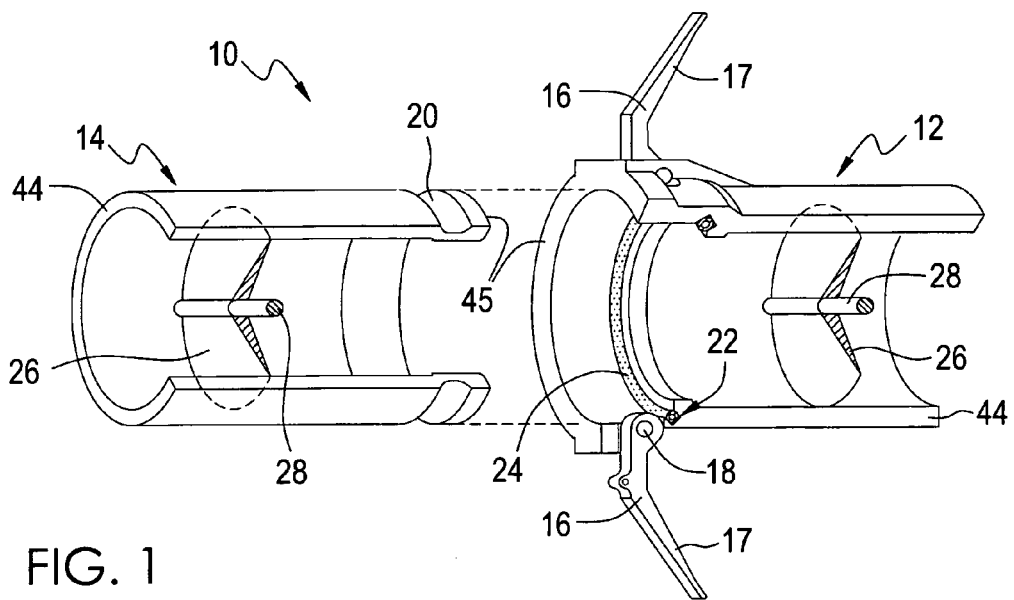
FIG. 1 is perspective view of the present invention.

With regard to reference numerals used, the following numbering is used throughout the drawings.

10 present invention
12 female end
14 male end
16 cam lever
17 lever portion
18 cam portion
20 groove
22 recess
24 O-ring
26 check valve
28 pivot pin
30 housing
32 rod
34 lever
35 connecting arm
36 base of lever
38 connecting arm
40 pressure relief valve
42 pressure relief valve
44 wall of cam lock fitting
45 end of cam lock fitting
46 spring
48 ball

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims. FIGS. 1–6 illustrate the present invention wherein a cam lock fitting having a check valve is disclosed.

Turning to FIG. 1, therein is shown the present invention 10 showing a cam lock fitting having a female end portion 12 and a male end portion 14 each having ends 45. The female portion 12 has a pair of cam levers 16, each having a lever portion 17 and a cam portion 18 thereon, which cam portion locks the female end 12 to the male end 14 by seating the cam portion 18 of the female portion within groove 20 of the male portion as the two portions are joined. The cam portion 18 passes or rotates through an opening in the wall 44 of the female portion or end 12. Also shown on the female portion is a circular recess 22 having an O-ring seal 24 therein. Shown disposed in the female end 12 and male end 14 of the cam lock fitting 10 is a check valve 26 disposed on a pivot pin 28 which pin is mounted into the wall 44 of the respective ends of the cam lock fitting. The present invention 10 can be adapted so that only the female end 12 or the male end 14 could be the end having the check valve 26 thereon or both ends 12, 14 could each have a check valve thereon.

Figure 2:
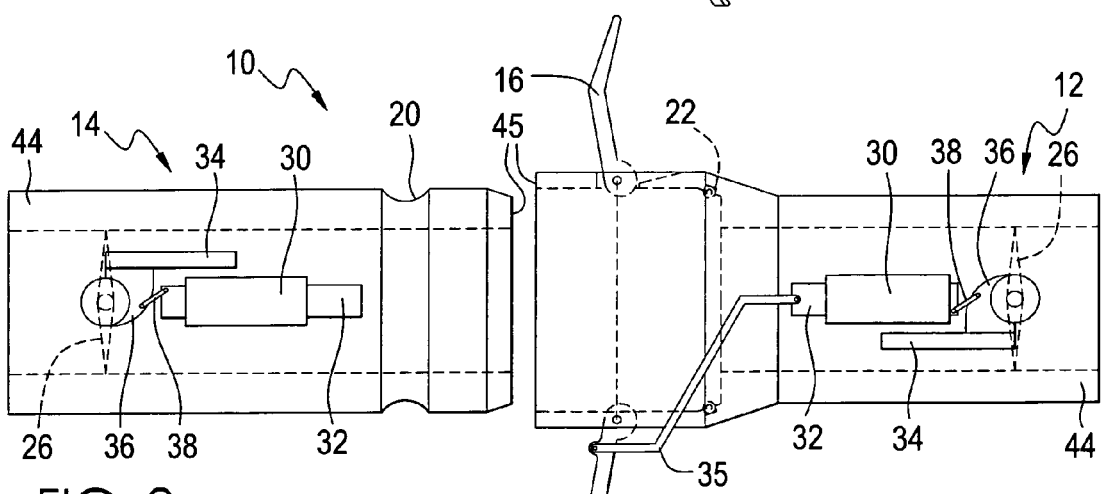
FIG. 2 is a plan view of the present invention.
Figure 4:
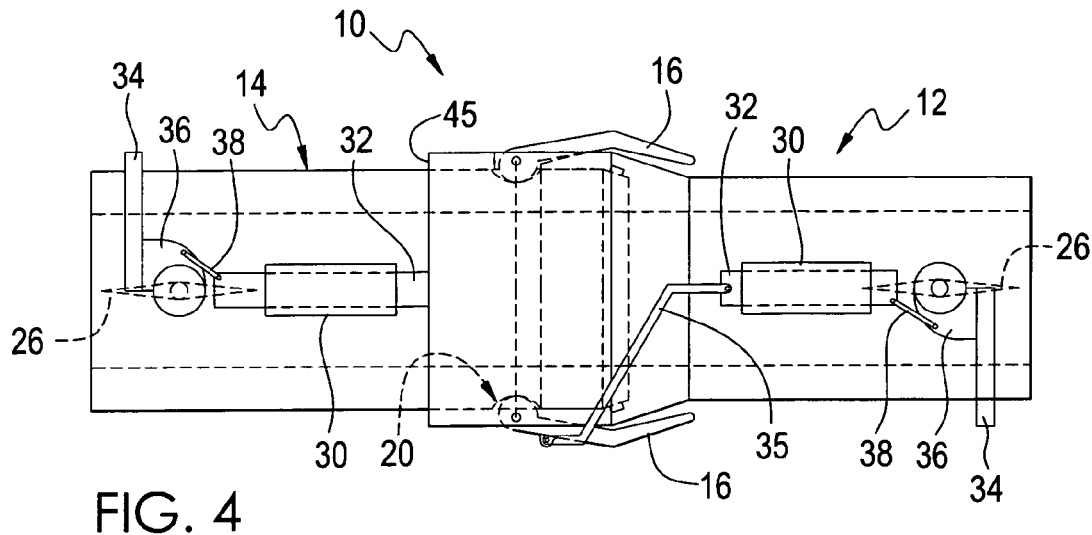
FIG. 4 is a plan view of the present invention shown in operative connection.

Turning to FIGS. 2 and 4, shown therein is the present invention 10 along with the female portion 12 and the male portion 14 of the cam lock fitting being disconnected in FIG. 2 and connected in FIG. 4. Shown on the outside of the wall 44 of each portion of the cam lock fitting 12, 14 is a housing 30 having a movable rod member 32 slidably therein wherein the rod member mounted on the female cam lock fitting has a first end having a connecting link or arm 35 thereon connecting the rod 32 to the lever 16 so that when the lever 16 is opened as would occur when the cam lock fitting was being disconnected, the rod 32 would be pulled toward the open end of the cam lock fitting thereby moving the connecting arm 38 and lever base 36 which form an external member connected to the check valve 26 so that the check valve is automatically moved to the closed position when the cam lock fitting is disconnected. Check valve 26 could also be manually operated by lever 34. Turning to the male portion 14, also shown are the housing 30 along with rod 32, lever 34 and lever base 36 of an external member along with the connecting arm 38. When the slidable rod 32 is moved away from the female portion 12 the check valve 26 is closed which occurs when the male end 14 is disconnected from the female end 12 and when the male portion is inserted into the female portion the check valve 26 would be opened. Also, the valve 26 could be manually operated by lever 34. Means for moving the check valve 26 is provided by the rod 32, housing 30, arm 38 as the end of the rod contacts the end 45 of the female portion 12 as portions 12, 14 are connected.

Figure 3:
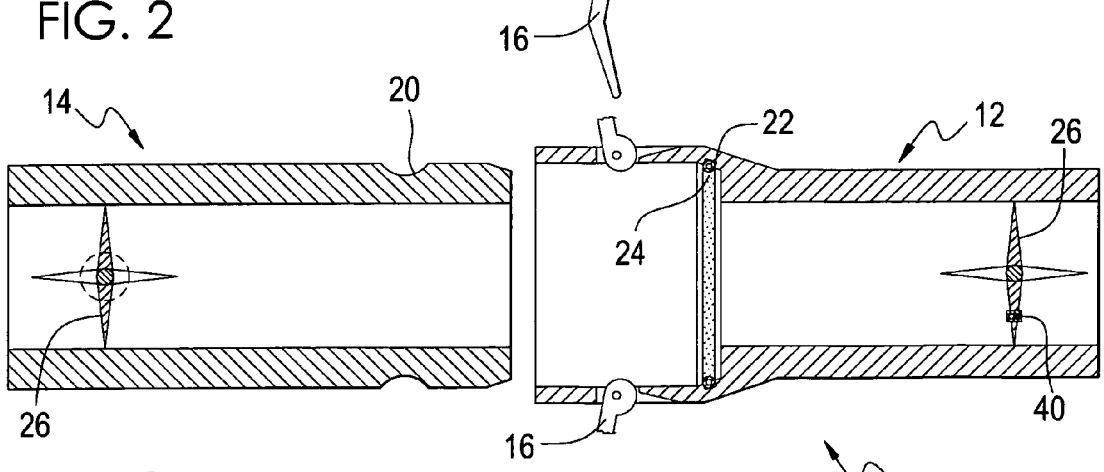
FIG. 3 is a cross section view of the present invention.

Turning to FIG. 3, shown therein is the present invention 10 along with the female portion 12 and the male portion 14. Also shown is the check valve 26 having a pressure relief valve 40 thereon so that if a vacuum exists inside the hose of the female coupling, the pressure relief valve 40 will open allowing atmospheric pressure equalization of the inside of the cam lock fitting 12. Check valve 40 could be designed to operate with either a pressure or vacuum differential in the hose.

Figure 5:
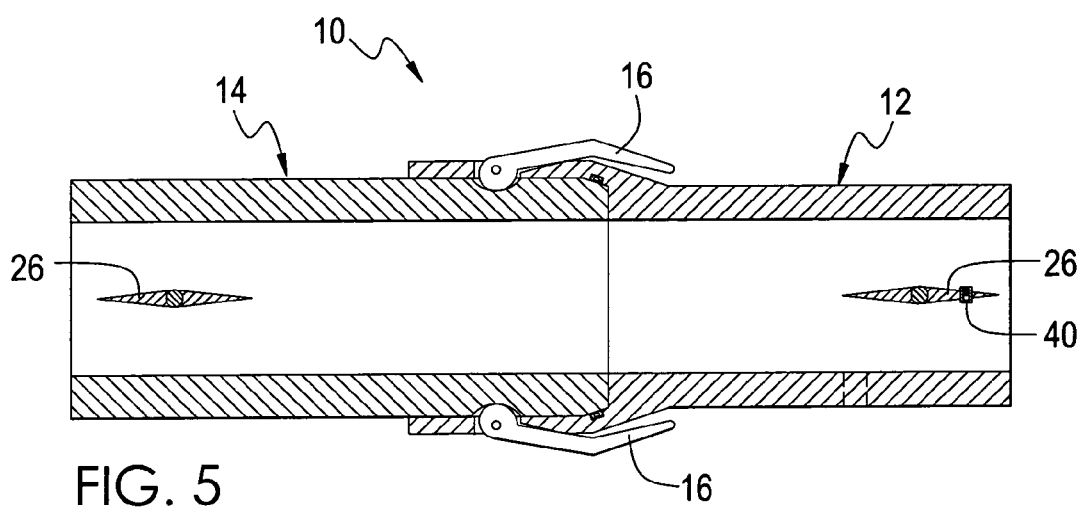
FIG. 5 is a sectional view of the present invention shown in operative connection.
Figure 6:
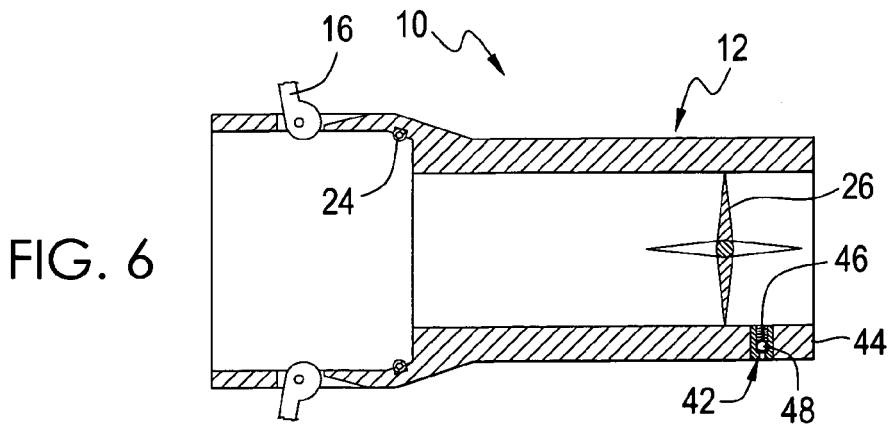
FIG. 6 is a sectional view of a portion of the present invention.

Turning to FIGS. 5 and 6, therein is shown the present invention 10 along with the female portion 12 and the male portion 14. FIG. 5 shows the check valve 26 having a pressure relief valve 40 thereon so that if a vacuum exists inside the hose of the female coupling, the pressure relief valve 40 will open allowing atmospheric pressure equalization of the inside of the cam lock fitting 12. FIG. 6 also shows an embodiment wherein a pressure relief valve 42 is placed in the wall 44 of the female cam lock fitting 12. The components of the pressure relief valve include the spring 46 along with a ball-type valve 48. The function of the pressure relief valve 40 and 42 is otherwise substantially the same and could be disposed in either the male 14 or female 12 ends.

In operation, the check valve 26 of the present invention 10 is mechanically operated by linkage 35 connected to the cam lock lever 16 so that when the lever 16 is opened the check valve 26 is automatically closed. When the check valve 26 is closed the pressure relief valve 40, 42 will allow air to pass from the outside to the inside to relieve any vacuum on the inside of the line/hose connected to the cam lock fittings 12, 14 in order to prevent a burp from coming out the end of the hose upon disconnection of the male and female ends 12, 14 of the cam lock fitting and hose.

I claim:

1. An apparatus for a cam lock fitting, comprising:
a) male and female portions adapted for being connected to each other, said male portion having an end thereon and an external circumferential groove adjacent said end, said female portion having an end thereon and an internal circular recess disposed therein adjacent said end, a seal being disposed in said recess, wherein said end of said male portion contacts said seal of said female portion when said male and female portions are connected, a pair of cam levers being disposed on opposite sides of said female portion having a lever portion and a cam portion wherein each said cam portion of said cam levers is adapted to rotate through the wall of said female portion and into said groove so as to removably join said male portion to said female portion, wherein each said cam lever has a first closed position when said male and female portions are joined together and a second open position when said male and female portions are disconnected from each other;
b) a first check valve being disposed internal said female portion so that said first check valve is open in a first position and closed in a second position, a first pivot pin disposed in the wall of said female portion, wherein said first check valve is disposed on said first pivot pin, wherein a first external member connected to said first check valve extends through the wall of said female portion for moving said first check valve between said first and second positions so that when said first external member is in a first position said first check valve is open and when said first external member is in a second position said first check valve is closed; and,
c) a connecting arm having first and second ends, said first end connected to said cam lever and said second end adapted for connection to said first external member wherein said first check valve is moved to said open position when said cam lever is in said closed position and said first check valve is moved to said closed position when said cam lever is in said open position.

2. The apparatus of claim 1, further comprising:
a) a second check valve being disposed internal said male portion so that said second check valve is open in a first position and closed in a second position, wherein a second external member connected to said second check valve extends through the wall of said male portion for moving said second check valve between said first and second position so that when said second external member is in a first position said second check valve is open and when said second external member is in a second position said second check valve is closed; and,
b) means for moving said second external member whereby said second check valve is moved to said open position when said male and female portions are connected to each other and said second check valve is moved to said closed position when said male and female portions are disconnected from each other.

3. The apparatus of claim 2, further comprising a pressure relief valve being disposed on said first check valve to permit a vacuum to be released from inside the female portion.

4. The apparatus of claim 3, further comprising a pressure relief valve being disposed on said second check valve to permit a vacuum to be released from inside the male portion.

5. The apparatus of claim 4, further comprising a pressure relief valve being disposed in the wall of said female portion to permit a vacuum to be released from inside the female portion.

6. The apparatus of claim 5, further comprising a pressure relief valve being disposed in the wall of said male portion to permit a vacuum to be released from inside the male portion.

7. The apparatus of claim 6, further comprising:
a) a first housing having a bore therein with first and second ends being disposed on the external surface of said female portion between said cam lever and said first external member so that said first housing is longitudinally disposed on said female portion;
b) a first rod having first and second ends being slidably disposed in said first housing;
c) wherein said second end of said connecting arm is attached to said first end of said first rod, and,
d) wherein said second end of said first rod is adapted for connection to said first external member.

8. The apparatus of claim 7, wherein said means for moving comprises:
a) a second housing having a bore therein with first and second ends being disposed on the external surface of said male portion between said end and said second external member so that said second housing is longitudinally disposed on said male portion;
b) a second rod having first and second ends being slidably disposed in said second housing;
c) wherein said first end of said second rod is slidable in said second housing in response to said first end coming into contact with said end of said female portion as said male portion is joined to said female portion; and,
d) wherein said second end of said second rod is adapted for connection to said second external member.

9. The apparatus of claim 8, further comprising a first external lever being disposed on said first external member so that a user can movably open and close said first check valve.

10. The apparatus of claim 9, further comprising a second external lever being disposed on said second external member so that a user can movably open and close said second check valve.

* * * * *